US008588769B2

(12) United States Patent
Saitou

(10) Patent No.: US 8,588,769 B2
(45) Date of Patent: Nov. 19, 2013

(54) WIRELESS CONNECTION DEVICE AND WIRELESS COMMUNICATION DEVICE

(75) Inventor: Tomoharu Saitou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1174 days.

(21) Appl. No.: 11/641,712

(22) Filed: Dec. 20, 2006

(65) Prior Publication Data

US 2008/0007485 A1 Jan. 10, 2008

(30) Foreign Application Priority Data

Jul. 5, 2006 (JP) ................................. 2006-185838

(51) Int. Cl.
*H04W 4/00* (2009.01)

(52) U.S. Cl.
USPC .......... 455/426.1; 455/425; 455/334; 455/68; 455/550.1; 455/438; 455/558; 455/421; 455/567; 455/557; 455/410; 455/562.1; 455/412.2

(58) Field of Classification Search
USPC ......... 370/252, 328, 310, 334, 349, 336, 338, 370/315, 330, 395.61, 403, 475, 352; 455/425, 334, 68, 550.1, 562.1, 438, 455/558, 421, 41.2, 567, 557, 435, 410, 455/412.2; 379/265.01, 250
See application file for complete search history.

(56) References Cited

U.S. PATENT DOCUMENTS

| | | | | |
|---|---|---|---|---|
| 6,361,357 B1 * | 3/2002 | Stillwell et al. | ............... | 439/490 |
| 7,221,961 B1 * | 5/2007 | Fukumoto et al. | ............. | 455/557 |
| 7,593,719 B2 * | 9/2009 | Kim | ........................... | 455/412.2 |
| 8,031,057 B2 * | 10/2011 | McNeely et al. | ........ | 340/286.07 |
| 8,044,878 B2 * | 10/2011 | Lee | ................................. | 345/2.3 |
| 2002/0002056 A1 | 1/2002 | Kobayashi | | |
| 2002/0176225 A1 * | 11/2002 | O'Hara et al. | ................ | 361/683 |
| 2003/0154311 A1 * | 8/2003 | Critz et al. | .................... | 709/250 |
| 2004/0012669 A1 * | 1/2004 | Drell et al. | ................. | 348/14.08 |

(Continued)

FOREIGN PATENT DOCUMENTS

| | | |
|---|---|---|
| EP | 1 394 988 | 3/2004 |
| JP | 2000-134663 | 5/2000 |

(Continued)

OTHER PUBLICATIONS

Electronic Translation of JP 2006-128908, publication date May 2006.*

(Continued)

*Primary Examiner* — Joseph Arevalo
(74) *Attorney, Agent, or Firm* — Fujitsu Patent Center

(57) ABSTRACT

To make it easy to specify a terminal (wireless communication device) connected to an access point (wireless connection device) by performing display corresponding to the access point to which the terminal is connected. A wireless connection device reads, from a storage unit, specified information for designating a display mode for specifying a connection of the wireless connection device itself, performs wireless communications with a wireless communication device, and notifies the wireless communication device of the specified information read from the storage unit. On the other hand, the wireless communication device performs the wireless communications with the wireless connection device, receives the specified information from the wireless connection device, and conducts the display in the display mode designated in the specified information.

20 Claims, 12 Drawing Sheets

(56) References Cited

U.S. PATENT DOCUMENTS

| | | |
|---|---|---|
| 2004/0043766 A1 | 3/2004 | Sashihara |
| 2004/0179505 A1* | 9/2004 | Critz et al. .................. 370/338 |
| 2004/0203698 A1* | 10/2004 | Comp ......................... 455/421 |
| 2004/0204093 A1* | 10/2004 | Imaeda ....................... 455/558 |
| 2004/0221215 A1* | 11/2004 | Kumaki ....................... 714/738 |
| 2005/0181798 A1 | 8/2005 | Monden et al. |
| 2006/0002352 A1* | 1/2006 | Nakamura ................... 370/338 |
| 2006/0039029 A1* | 2/2006 | Yagita .......................... 358/1.15 |
| 2006/0161711 A1* | 7/2006 | Inoue ........................... 710/301 |
| 2006/0233161 A1* | 10/2006 | Koenck et al. ............... 370/353 |
| 2007/0133780 A1* | 6/2007 | Berner et al. ............ 379/265.01 |
| 2007/0220273 A1* | 9/2007 | Campisi ....................... 713/186 |
| 2008/0261647 A1* | 10/2008 | Hamada ..................... 455/550.1 |

FOREIGN PATENT DOCUMENTS

| | | |
|---|---|---|
| JP | 2001-274802 A | 10/2001 |
| JP | 2002-305521 A | 10/2002 |
| JP | 2004-088424 | 3/2004 |
| JP | 2005-217814 | 8/2005 |
| JP | 2006128908 A * | 5/2006 |

OTHER PUBLICATIONS

Japanese Office Action mailed Aug. 16, 2011 for corresponding Japanese Application No. 2006-185838, with English-language Translation.

* cited by examiner

| COLOR | VALUE |
|---|---|
| BLUE | 0x00 |
| GREEN | 0x01 |
| ORANGE | 0x02 |
| RED | 0x03 |

| LIGHT EMITTING PATTERN | VALUE |
|---|---|
| LIGHT-OUT | 0x00 |
| EVER-LIGHTING | 0x01 |
| FLICKER 1 | 0x02 |
| FLICKER 2 | 0x03 |

| 802.11 HEADER | ID | LENGTH | VALUE | FCS |

WIRELESS CONNECTION DEVICE AND WIRELESS COMMUNICATION DEVICE

BACKGROUND OF THE INVENTION

The present invention relates to a technology of specifying a base station to which a wireless terminal is connected.

IEEE802.11 defines standards for networks utilizing radio waves and infrared-rays as transmission paths.

For example, a so-called wireless LAN is known, wherein each terminal connects to the access point functioning as a bridge and a switch by use of the radio waves having a predetermined frequency band (2.4 GHz band, 5 GHz band, etc), and wireless communications can be performed via the access point.

Over the recent years, this type of wireless LAN has widely spread owing to improvement of performance, a decrease in price, etc of the access point and a device such as a wireless LAN interface, which configure the wireless LAN.

Further, technologies disclosed in, e.g., the following Patent documents 1-3 are given as the prior arts related to the invention of the present application.

[Patent document 1] Japanese Patent Application Laid-Open Publication No. 2005-217814
[Patent document 2] Japanese Patent Application Laid-Open Publication No. 2004-088424
[Patent document 3] Japanese Patent Application Laid-Open Publication No. 2000-134663

SUMMARY OF THE INVENTION

In the case of specifying a location of the connected terminal in a network, if classified as a wired network, the location of each terminal can be specified by tracing a cable.

Supposing that the network is a wireless network, however, if within a reachable range of the radio waves from a wireless access point (which will hereinafter be referred to also simply as "within an area"), the connection can be established from everywhere, and hence it is quite hard to specify the location of the terminal.

Therefore, in the case of trying to specify the location of the connected terminal in the wireless network, for instance, it is required to check identifying information etc about the terminal existing within the area and to collate this information with information on the side of the access point.

In a large-scale wireless network where a multiplicity of terminals exists, however, it is hard to check all the terminals one by one.

Particularly, in a case where a multiplicity of unspecified users utilizes the network as in a public wireless LAN spot, it is not realistic to get all the users employing the computers within the area to disclose the information on the computers.

Such being the case, the present invention provides a technology of making it easy to specify the terminal (a wireless communication device) connected to the access point (a relay device) by conducting display corresponding to the access point to which the terminal is connected.

The present invention adopts the following configurations in order to solve the problems.

Namely, A wireless connection device (access pint) according to the present invention comprises:

a storage unit stored with specified information for designating a display mode for specifying a connection of the wireless connection device itself;

a wireless communication unit performing wireless communications with a wireless communication device; and a notifying module reading the specified information, and notifying the wireless communication device of the specified information via the wireless communication unit.

The wireless connection device may further comprise a relay unit that relays the communications between the wireless communication device and another device via the wireless communication unit.

The wireless communication unit may insert the specified information given from the notifying module into a Beacon frame or a data frame, and may thus transmit the specified-information-attached frame to the wireless communication device.

The wireless communication unit, when establishing a connection to the wireless communication device, may transmit the specified information to the wireless communication device.

Further, a wireless connection method according to the present invention is executed by a wireless connection device and comprises:

a step of reading, from a storage unit, specified information for designating a display mode for specifying a connection of the wireless connection device itself;

a step of performing wireless communications with a wireless communication device; and a step of notifying the wireless communication device of the specified information read from the storage unit.

In the wireless connection method, the communications between the wireless communication device and another device may be relayed through the wireless communications.

In the wireless connection method, the specified information may be inserted into a Beacon frame or a data frame, and the specified-information-attached frame may be transmitted to the wireless communication device.

In the wireless connection method, when establishing a connection to the wireless communication device, the specified information may be transmitted to the wireless communication device.

Still further, a wireless communication device (wireless terminal) according to the present invention comprises:

a wireless communication unit performing wireless communications with a wireless connection device;

a specified information acquiring module receiving specified information that designates a display mode for specifying a connection to the wireless connection device via the wireless communication unit; and a display control module conducting display in the display mode designated in the specified information.

The specified information acquiring module may extract the specified information from a Beacon frame or a data frame received by the wireless communication unit.

The wireless communication unit, when making a request for a connection to the wireless connection device (e.g., when transmitting a probe request, when transmitting an authentication request, or when transmitting a connection request (Association Request)), may send back a signal purporting that the specified information has been acquired.

Yet further, a wireless communication method according to the present invention is executed by a wireless communication device, and comprises:

a step of performing wireless communications with a wireless connection device;

a step of receiving, for the wireless connection device, specified information that designates a display mode for specifying a connection to the wireless connection device; and a step of conducting display in the display mode designated in the specified information.

In the wireless communication method, the specified information may be extracted from the received Beacon frame or data frame.

In the wireless communication method, when making a request for a connection to the wireless connection device (e.g., when transmitting a probe request, when transmitting an authentication request, or when transmitting a connection request (Association Request)), a signal purporting that the specified information has been acquired may be sent back.

The specified information may be information that designates a display color and/or a light emitting pattern.

The specified information may be information that designates a display mode corresponding to a channel or a network that are utilized for the wireless communications.

Further, the present invention may also be a wireless connection program for making a computer execute the wireless connection method. Moreover, the present invention may further be a wireless communication program for making a computer execute the wireless communication method. Still further, the present invention may also be a readable-by-computer recording medium recorded with these programs. The computer is made to read and execute the programs on this recording medium, whereby functions thereof can be provided.

Herein, the readable-by-computer recording medium connotes a recording medium capable of storing information such as data, programs, etc electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc are given as the recording mediums fixed within the computer.

The present invention is capable of making it easy to specify the terminal (the wireless communication device) connected to the access point (the wireless connection device) by conducting the display corresponding to the access point to which the terminal is connected.

DETAILED DESCRIPTION OF THE PREFERRED EMBODIMENT

First Embodiment

§1. Device Configuration

A best mode for carrying out the present invention will hereinafter be described with reference to the drawings. A configuration in the following embodiment is an exemplification, and the present invention is not limited to the configuration in the embodiment.

Figure 1:
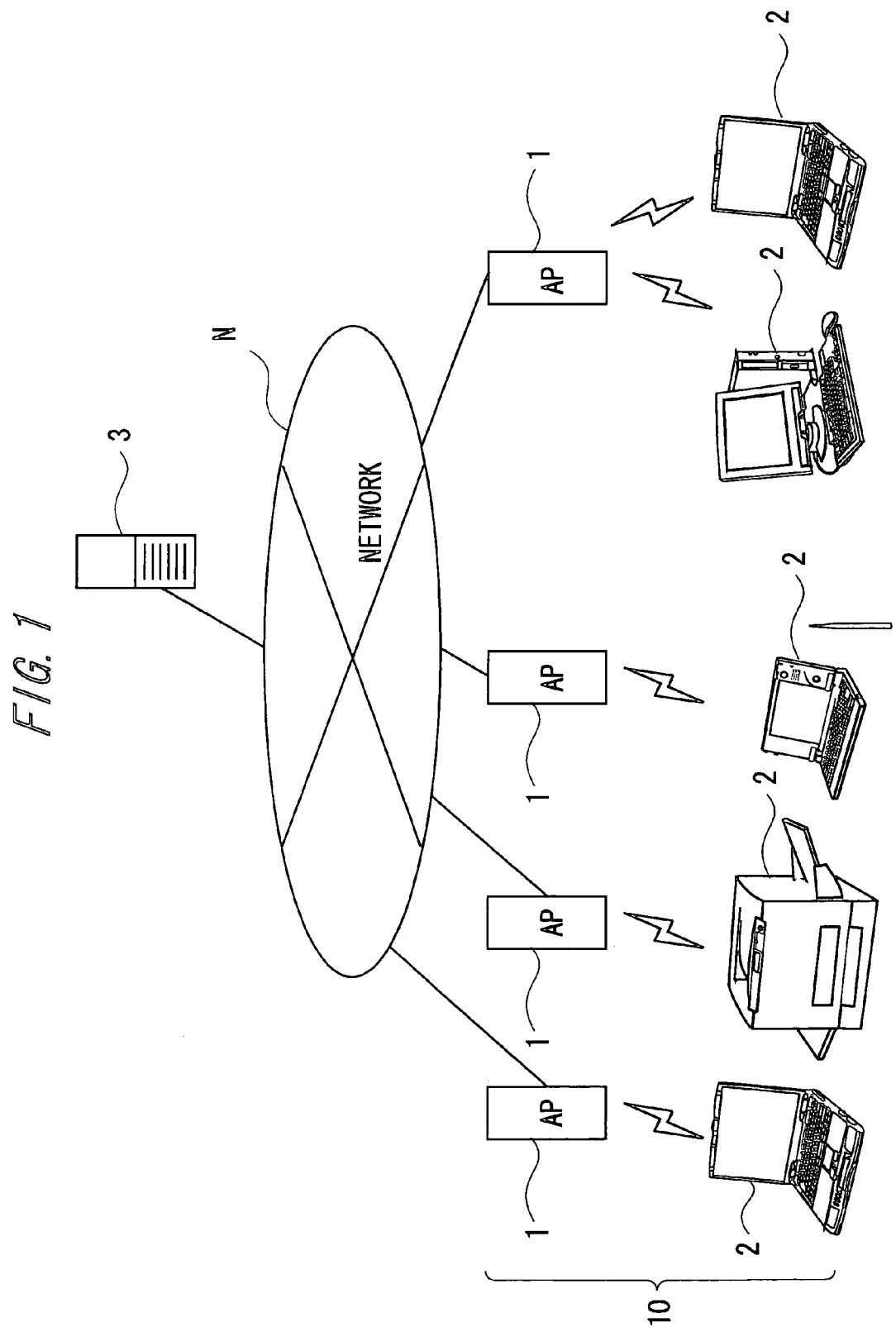
FIG. 1 is a schematic view of a wireless LAN system in a first embodiment according to the present invention.

FIG. 1 is a schematic view of a wireless LAN system according to the present invention.

A wireless LAN system 10 in the present example includes a plurality of access points (corresponding to wireless connection devices and referred to also as wireless base stations) 1 and a plurality of wireless terminals (including wireless communication devices) 2.

The access point 1 connects, as defined by IEEE802.11, to a terminal 2 by use of radio waves and infrared rays as a transmission path, and relays communications between the terminal 2 and one other communication device (a computer) on the side of a wired network N.

Figure 2:
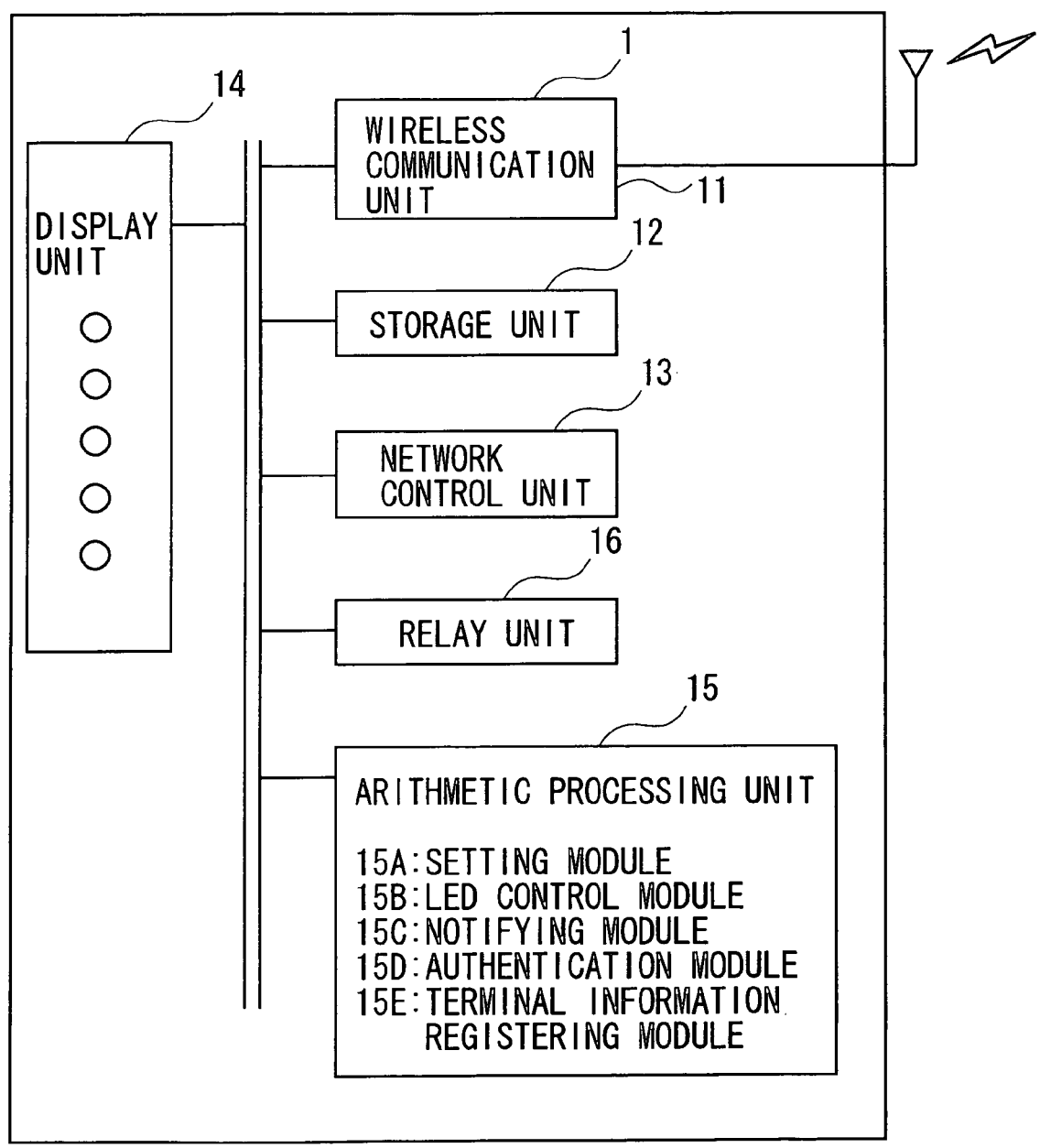
FIG. 2 is a schematic diagram of an access point.

FIG. 2 is a schematic view of a configuration of the access point 1. The access point 1 includes a wireless communication unit 11, a storage unit 12, a network control unit (an interface) 13, a display unit 14, an arithmetic processing unit 15 and a relay unit 16.

The wireless communication unit 11 performs the wireless communications with the wireless terminal, wherein the transmission path involves using the radio waves of a 2.4 GHz band or a 5 GHz band.

The storage unit 12 is a nonvolatile memory stored with programs such as firmware (a wireless connection program) and an embedded OS and with items of setting information.

The network control unit 13 controls the communications with other communication devices via the wired network N on the basis of a predetermined protocol such as TCP/IP (Transmission Control Protocol/Internet Protocol).

Figures 3, 4, 5:
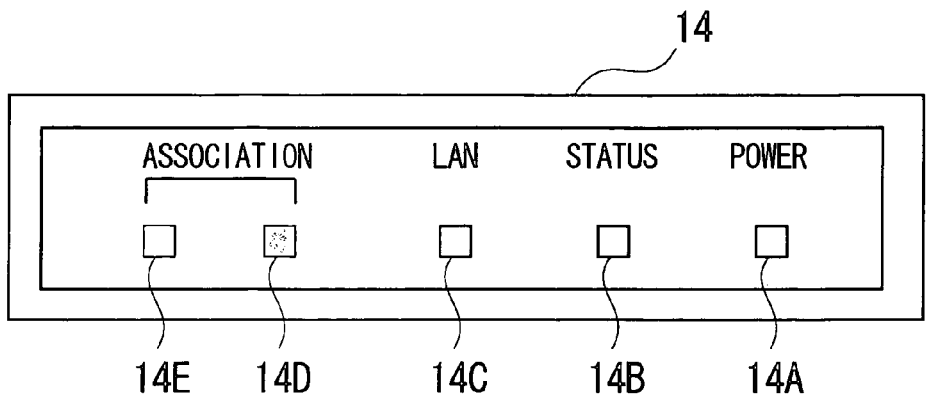
FIG. 3 is an explanatory diagram of a display unit in the access point.
FIG. 4 is a diagram showing an example of color values.
FIG. 5 is a diagram showing an example of light emitting patterns.

The display unit 14 has, as illustrated in FIG. 3, a plurality of LEDs (light emitting diodes) 14A-14E, wherein a communication status and a setting status of the access point 1 are indicated by lighting states of the LEDs 14A-14E as will be described later on.

The relay unit 16 analyzes a data frame received from the terminal 2 and transmits (relays) the data frame to other devices such as the computers and routers, corresponding to a destination of the data.

The arithmetic processing unit 15 executes the program by properly reading the program from the storage unit 12, and executes an arithmetic process with respect to information obtained via the wireless communication unit 11, the network control unit 13, etc, thereby functioning also as a setting module 15A, an LED control module (a display control module) 15B, a notifying module 15C, an authentication module 15D and a terminal information registering module 15E.

This setting module 15A receives specified information (color information in the present example) that designates a display mode for specifying the connection to the self-device through an operation on an unillustrated operation unit or an input from another computer, and stores (sets) the specified information in the storage unit 12. Note that the color information consists of values specifying the colors of the LEDs driven to emit the light as shown in FIG. 4 and values specifying light emitting patterns of the LEDs as shown in FIG. 5.

The LED control module 15B controls the display mode (the light emission of the LEDs) of the display unit 14 on the basis of the color information set in the storage unit 12, a state of a power source and a communication status of the network control unit 13. For instance, the LED control module 15B sets a power LED 14A in a lighting state when the access point 1 is powered ON, and sets the power LED 14A in a light-out state when powered OFF. Further, a status LED 14B is set in the lighting state if the wireless communication unit 11 is in a status of being connected to at least one wireless terminal but is set in the light-out state if in a status of being unconnected. Moreover, a traffic LED 14C is set in a flickering state if the network control unit 13 is in a status of performing the communications with the computer on the side of the network N but is set in the light-out state if in a status of performing none of the communications.

Then, the LED control module 15B lights up association LEDs 14D, 14E on the basis of the color information. Herein, as shown in FIGS. 4 and 5, the LED is flickered in blue if a color value of the color information is 0x00 and a light emitting pattern is 0x02 and is lit up always in red if the color value of the color information is 0x03 and the light emitting pattern is 0x01. Note that a flicker 1 (0x00) and a flicker 2 (0x03) on the light emitting pattern are made to have different flicker timing such as flickering twice for 1 sec and blinking for 0.5 sec after the light-out for 1 sec.

Further, the display modes (the colors and the light emitting patterns) of the display unit 14 are not limited to those given above, and the display may be conducted in a predetermined number of different modes needed for specifying the connection. The first embodiment has exemplified the instance of providing the two association LEDs 14D, 14E as illustrated in FIG. 3, however, whatever number of the LEDs (light emitting elements) or of the display units may be available.

For example, four pieces of single-color LEDs in blue, green orange and red may be provided, and only one full-color LED may also be available. Moreover, there may be available a display mode of combining the colors of the plurality of LEDs (light emitting elements) and the plurality of light emitting patterns as in the case of the flicker 1 of the LED 14D in red and the ever-lighting of the LED 14E in blue.

Furthermore, the LEDs 14A-14C may also be made to function as the association LEDs in a way that causes these other LEDs 14A-14C to emit the light in the colors and in the light emitting patterns corresponding to the specified information on the occasion of the light emission of the LEDs 14A-14C without providing any LEDs dedicated to display the specified information. For example, when powered ON, the power LED 14A is made to emit the light in the color and in the light emitting pattern corresponding to the specified information.

Figure 6:
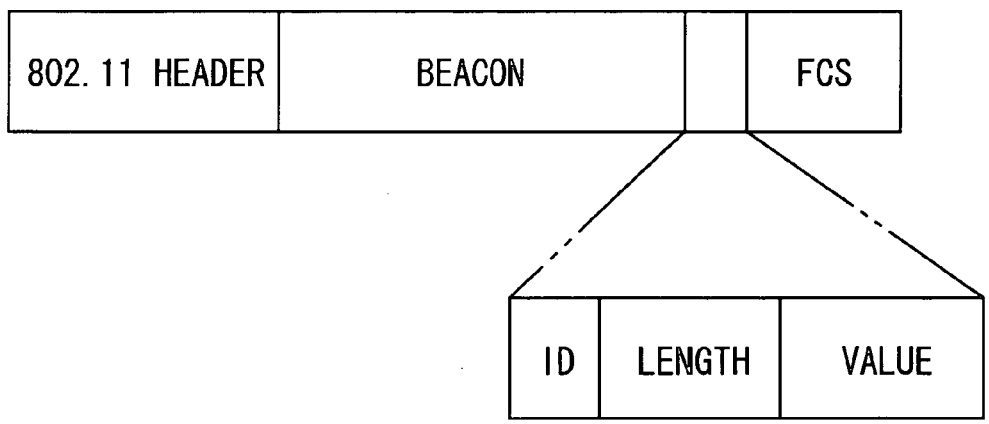
FIG. 6 is an explanatory diagram of a Beacon frame.

The notifying module 15C reads the specified information from the storage unit 12 and notifies the terminal 2 of the specified information via the wireless communication unit 11. In the present example, the specified information is inserted as "Option" into a Beacon frame and thus transmitted. FIG. 6 is a schematic diagram of the Beacon frame, wherein pieces of data such as "ID" identifying the specified information, "Length" showing a bit length and "Value" representing (a content of) the specified information are inserted therein.

The authentication module 15D authenticates the terminal 2 by use of an encryption key and a MAC address, and permits the connection of the validly authenticated terminal 2.

The terminal information registering module 15E acquires the information on the connected terminal and records (registers) this information in the storage unit 12.

Figure 7:
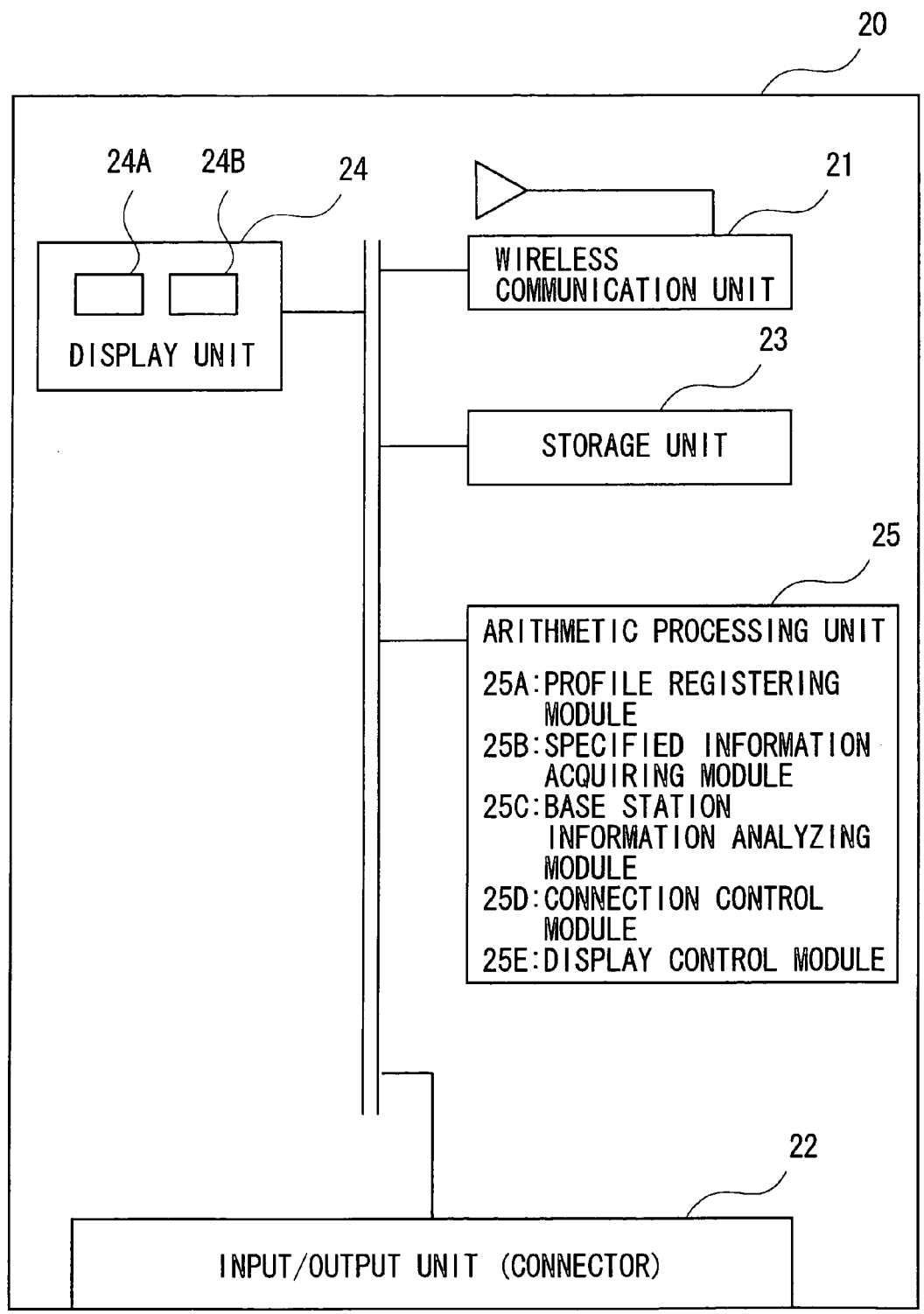
FIG. 7 is a schematic diagram of a wireless communication device.
Figure 8:
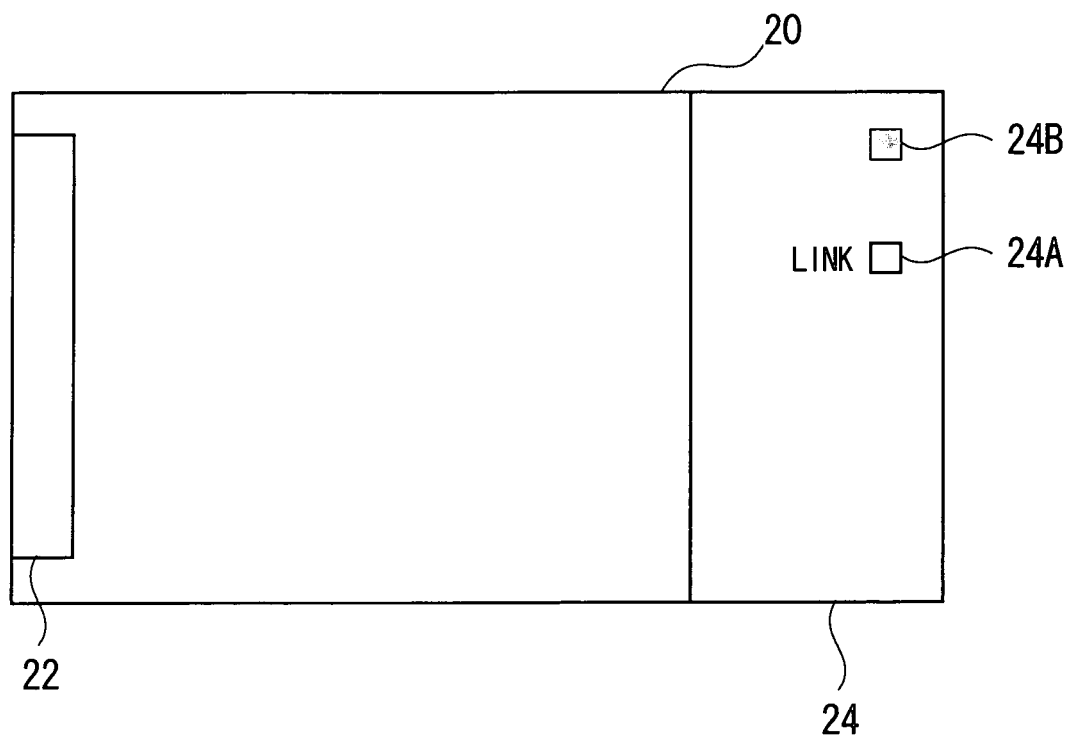
FIG. 8 is a view of an external configuration of a wireless LAN card.

FIG. 7 is a diagram schematically showing a configuration of the wireless communication device according to the present invention, and FIG. 8 is a view of an external configuration of a wireless LAN card by way of one example of the wireless communication device. The wireless LAN card 20 is inserted into a card slot of the terminal 2 such as a personal computer and a printer, thereby functioning as a network interface of the terminal 2.

The wireless communication device 20 includes a wireless communication unit 21, an input/output unit 22, a storage unit 23, a display unit 24 and an information processing unit 25.

The wireless communication unit 21 performs the wireless communications with the access point 1.

The input/output unit 22 inputs the data from the computer 2 and outputs the data from the network side to the computer 2.

The storage unit 23 is a storage means such as a ROM stored with identifying information like the MAC address etc and a nonvolatile RAM stored with firmware (a wireless connection program) and items of setting information.

The display unit 24 includes a plurality of LEDs 24A, 24B as shown in FIG. 8. The lighting states of the LEDs 24A, 24B indicate the communication statuses of the wireless communication device 20 as will be explained later on.

The information processing unit 25, which is constructed of a CPU, a main memory, etc, executes the program by reading this program from the storage unit 23 and executes the arithmetic process with respect to the information through the wireless communication unit 21 and the input/output unit 22, thereby functioning also as a profile registration module 25A, a specified information acquiring module 25B, a base station information analyzing module 25C, a connection control module 25D and a display control module 25E.

This profile registration module 25A registers (stores), in the storage unit 23, a profile that retains items of information such as the encryption key, a user ID and a password inputted via the input/output unit 22 from the terminal 2 as by an operation of the user, these items of information being utilized for authentication etc on the occasion of connecting to the access point 1.

The specified information acquiring module 25B receives the specified information from the access point 1. In the first embodiment, the specified information acquiring module 25B judges whether or not the Beacon frame received by the wireless communication unit 21 contains the ID that identifies the specified information and, if contained, extracts (acquires) an ID's value (Value) as the specified information. Further, the specified information acquiring module 25B, when acquiring the specified information, informs the connection control module 25D of the specified information as acknowledgment (which will hereinafter be referred to also as a display response), and makes the connection control module 25D transmit this specified information to the access point 1 when a connection request (Association Request) is given.

The base station information analyzing module 25C acquires items of information such as an SSID (Service Set Identifier) and a BSSID (Basis Service Set Identifier) about the access point (wireless base station) 1 from the Beacon frame.

The connection control module 25D requests the access point 1 for doing the authentication and for establishing the connection via the wireless communication unit 21, and establishes the connection to the access point 1. At this time, the connection control module 25D reads from the storage unit 23 the information necessary for the authentication and the connection, corresponding to the information of the access point 1 that is acquired by the base station information analyzing module 25C, and transmits the necessary information to the access point 1.

The display control module 25E controls the display unit 24 to display based on the display mode designated in the specified information acquired by the specified information acquiring module 25B and based on the communication status of the wireless communication unit 21. For instance, the display control module 25E controls the link LED 24A corresponding to the status of the wireless communication unit 21 so that the LED is lit up when connected to the access point 1, switched off when not connected and flickered when transmitting and receiving the data.

Further, when the specified information acquiring module 25B acquires the specified information, in the same way as the LEDs 14D, 14E described above are, the association LED 24B is made to emit the light in the colors and in the light emitting patterns, corresponding to the color values and the light emitting patterns in the specified information, which are shown in FIGS. 4 and 5.

FIG. 8 illustrates the example of providing the single association LED 24B, however, a plurality of association LEDs may also be provided without being limited to the single LED.

Moreover, without providing the LED dedicated to display the specified information, on the occasion of making another LED 24A emit the light, this LED 24 may serve to function as the association LED in a way that emits the light in the colors and in the light emitting patterns corresponding to the specified information. For example, when connecting to the access point 1, the link LED 24A is made to emit the light in the color and in the light emitting pattern corresponding to the specified information.

Another LED may also be a power LED that is lit up when powered ON and switched off when powered OFF, and may also be a plurality of link speed LEDs provided corresponding to link speeds (10 Mbps, 100 Mbps, 1 Gbps, etc) and indicating a present link speed in such a way that any one of these LEDs is lit up corresponding to a speed of the connected link.

Further, FIG. 8 illustrates the example of the wireless LAN card as the wireless communication device, however, the wireless communication device according to the present invention may, without being limited to this type of LAN card, also be the personal computer, the printer and the terminal itself such as a PDA, which each have the built-in units 21-25 and the built-in modules 25A-25E. In the present application, the operation of the terminal 2 serving as the wireless communication device and the operation of the wireless communication device 20 attached to the terminal 2, will be explained similarly as the operation of the terminal 2.

Moreover, part (25A-25E) of the wire communication device is actualized by the arithmetic processes based on the software and may also be configured by hardware components (electronic circuits) that actualize the same functions.

§2. Connection Procedures

Figure 9:
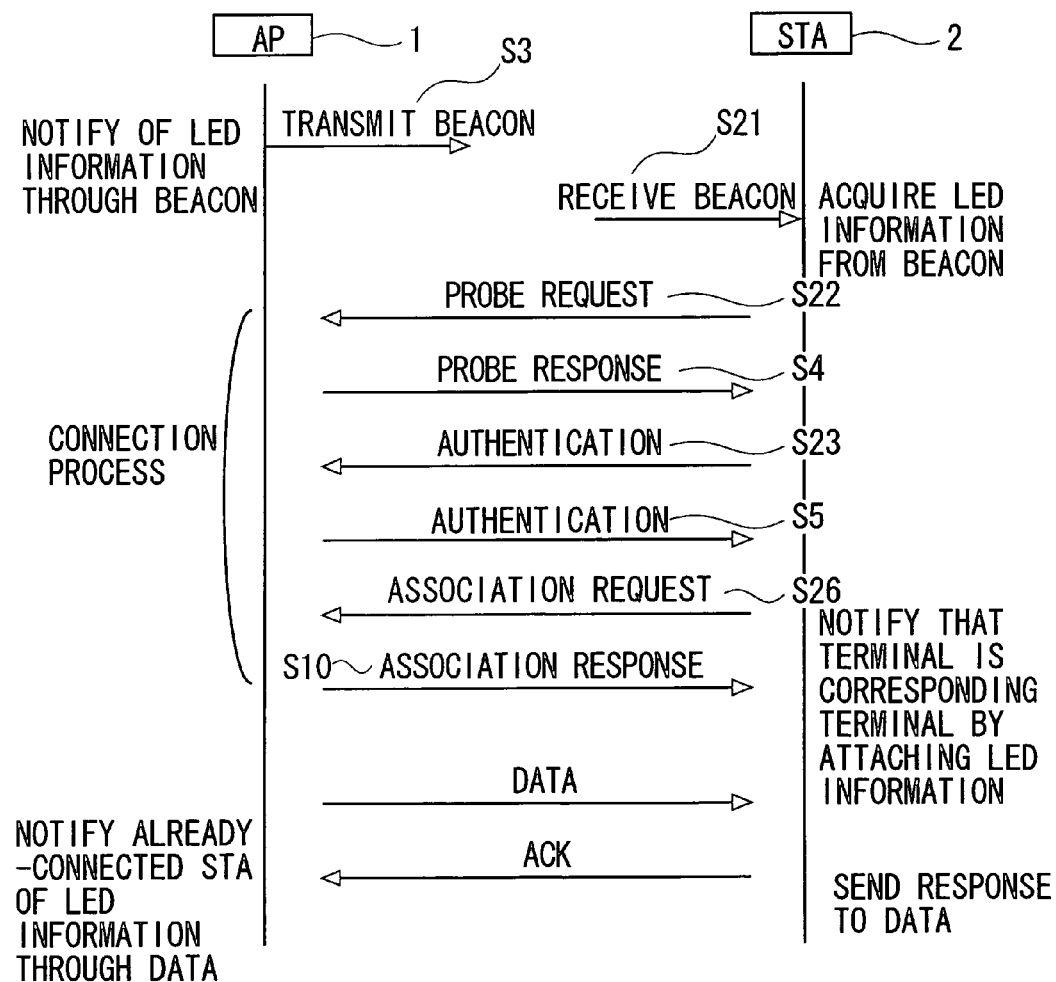
FIG. 9 is a sequence diagram when connected.
Figure 10:
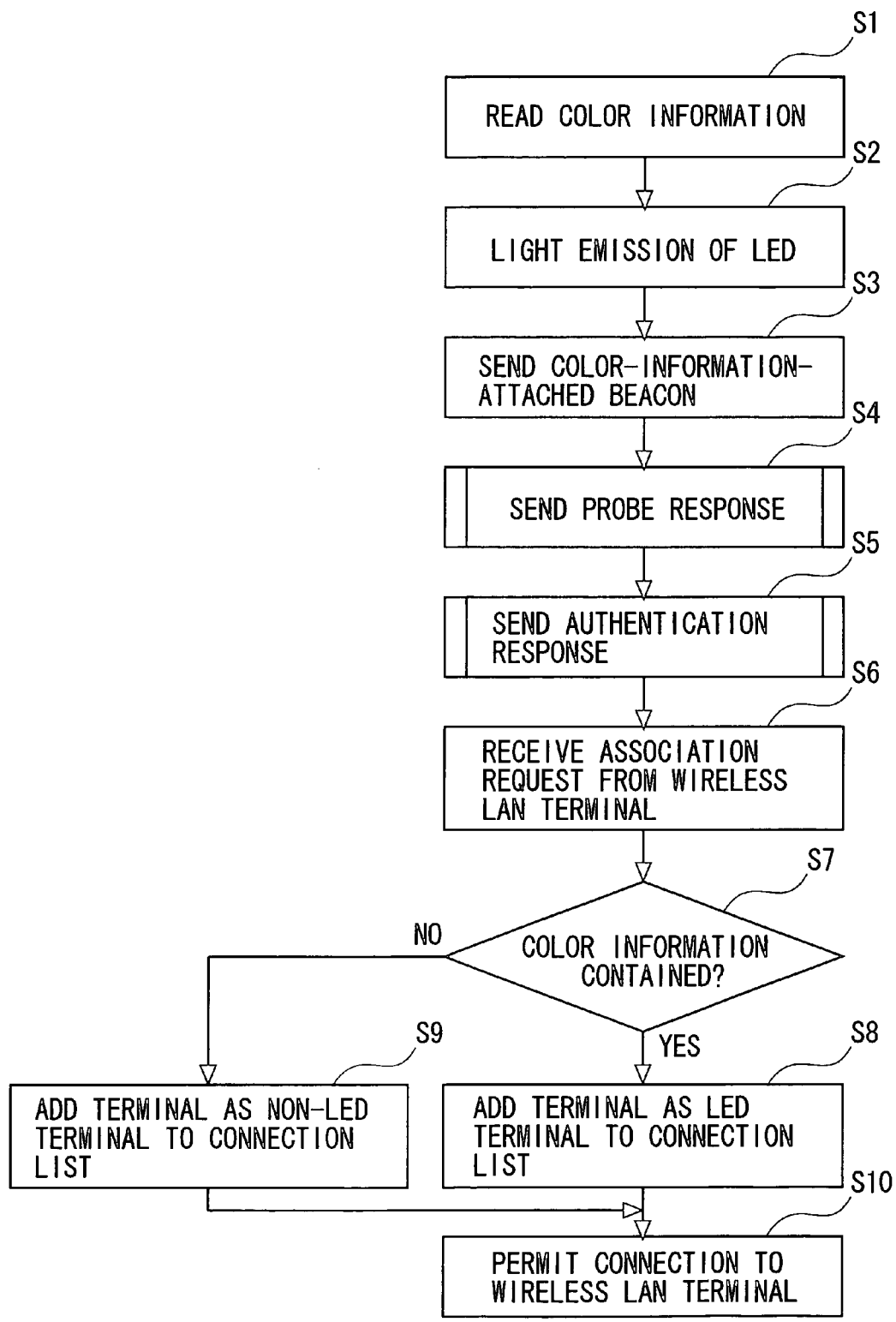
FIG. 10 is a flowchart of a wireless connection method.
Figure 11:
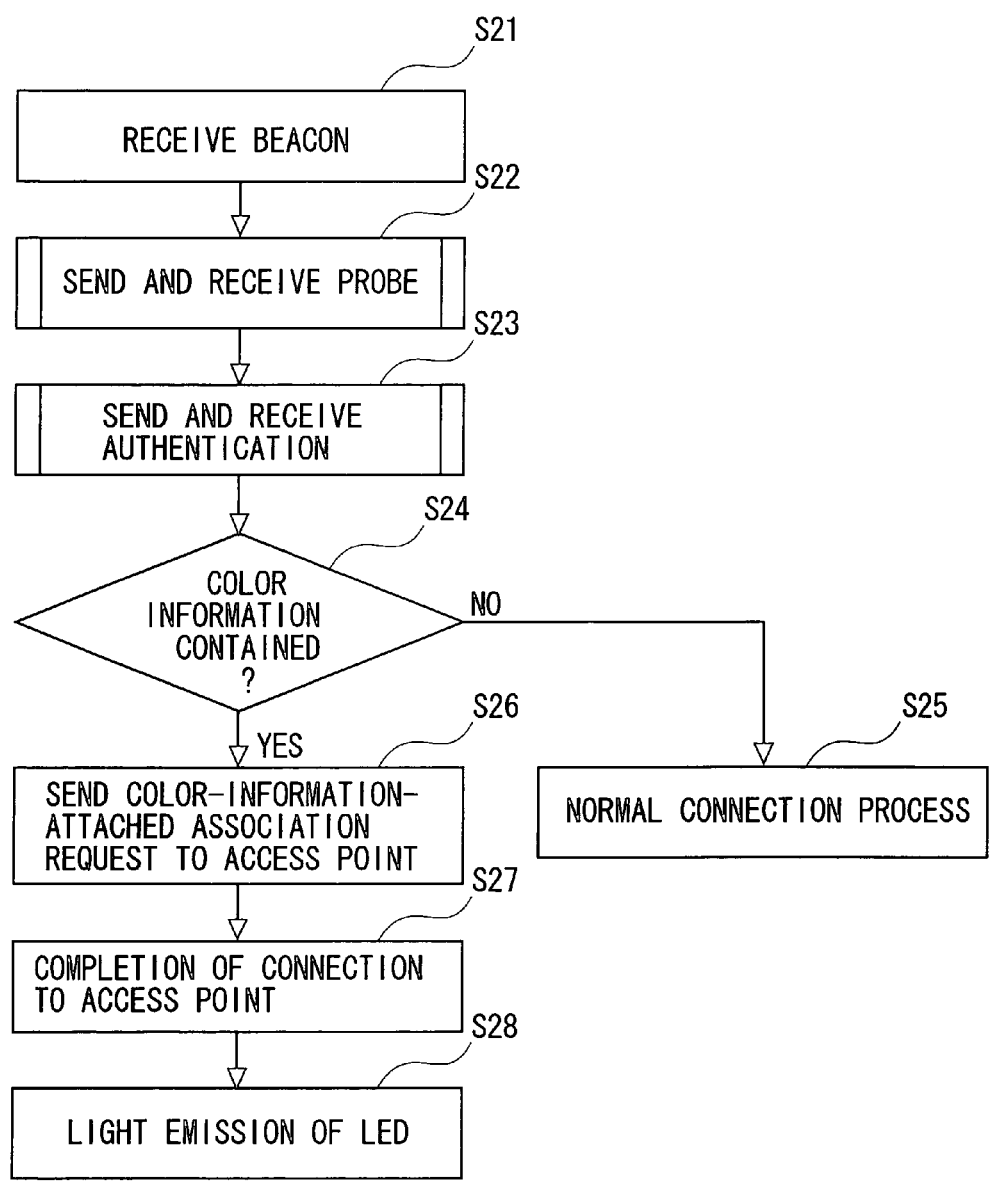
FIG. 11 is a flowchart of a wireless communication method.

Connection procedures taken by the above-configured access point 1 and by the terminal 2 will be described. FIG. 9 is a sequence diagram when establishing the connection, FIG. 10 is an explanatory diagram of a wireless connection method executed by a wireless connection program when the access point 1 establishes the connection, and FIG. 11 is an explanatory diagram of the wireless connection method executed by the wireless connection program when the terminal 2 establishes the connection.

The access point 1 receives an input of the color information when delivered from a factory or when an administrator etc conducts initial setting, and the setting module 15A stores the color information (the specified information) in the storage unit 12. For example, this setting module 15A has a function as a Web server that transmits a Web page (an HTML (HyperText Markup Language) file) for setting via the network N in response to a request given from another computers.

Another computer receives and displays this Web page on this computer, and, when the information such as the color information and the SSID is inputted by the administrator, transmits the input data to the access point 1. The setting module 15A of the access point 1 stores the input information (the color information etc) in the storage unit 12, i.e., sets the color information therein. Then, when the access point 1 is powered ON, the LED control module 15B reads the color information from the storage unit 12 (S1).

The LED control module 15B causes the LEDs 14D, 14E to emit the light in the colors corresponding to the color information and in the light emitting patterns as shown in FIGS. 4 and 5 (S2).

The notifying module 15C reads the specified information from the storage unit 12 and transmits the Beacon frame into which the specified information is inserted as "Option" as illustrated in FIG. 6 (S3).

Further, the access point 1, when receiving a probe request (Probe Request) from the terminal 2, the arithmetic processing unit 15 sends back predetermined information such as an ESSID (Extended SSID) and the BSSID as a probe response (Probe Response) (S4).

Still further, when receiving an authentication request (Authentication Request) from the terminal 2, it is judged whether a valid encryption key is used or not, and, if valid, an authentication frame (Authentication Response) is sent back (S5).

Then, when receiving a connection request (Association Request) from the authenticated terminal 2 (S6), the terminal information registering module 15E judges whether or not the connection request (Association Request) contains the acknowledgment (which will hereinafter be referred to also as the display response) of the color information (S7).

The terminal information registering module 15E, if the connection request (Association Request) contains the display response and if the color information specified by the display response is coincident with the transmitted color information, the terminal is added (registered) as an LED terminal (which is a terminal capable of displaying based on the specified information) to a connection list (S8), and, if the display response is not contained therein, this terminal is added as a non-LED terminal (which is a terminal incapable of displaying based on the specified information) to the connection list (S9).

Thereafter, the connection control module 25D permits the connection of the terminal 2 and transmits the connection response (Association Response) to the terminal 2, thereby establishing the connection (S10). This connection is maintained till the connection control module 25D receives a disassociation packet from the terminal 2. During the connection, the relay unit 16 relays the data frame received from the terminal 2 to a destination of this frame, and also relays the data frame addressed to the terminal 2 to this terminal 2.

On the other hand, the terminal 2 receives the Beacon frame from the access point 1 (S21). Further, the connection control module 25D transmits the probe request to each channel, and receives the probe response from the access point 1 (S22).

Still further, the connection control module 25D sends an authentication request to the access point 1 by use of the profile in the storage unit 23, and receives an authentication response therefrom (S23).

Then, the specified information acquiring module 25B judges whether or not the Beacon frame contains the specified information (the color information) (S24).

If the color information is not contained, the conventional connection (that does not use the color information) is established (S25), and, whereas if the color information is contained therein, the specified information acquiring module 25B acquires the color information, while the connection control module 25D sends to the access point 1 a connection request (Association Request) to which the acknowledgment (the display response) of the color information is attached (S26). In the first embodiment, the same information as the received color information is inserted as the display response into a connection request (Association Request) frame.

Then, when the connection control module 25D receives the connection response (Association Response) from the access point 1 and establishes the connection (S27), the display control module 25E causes the LED 24B to emit the light in the color corresponding to the color information and in the light emitting pattern as illustrated in FIGS. 4 and 5 (S28).

Figure 12:
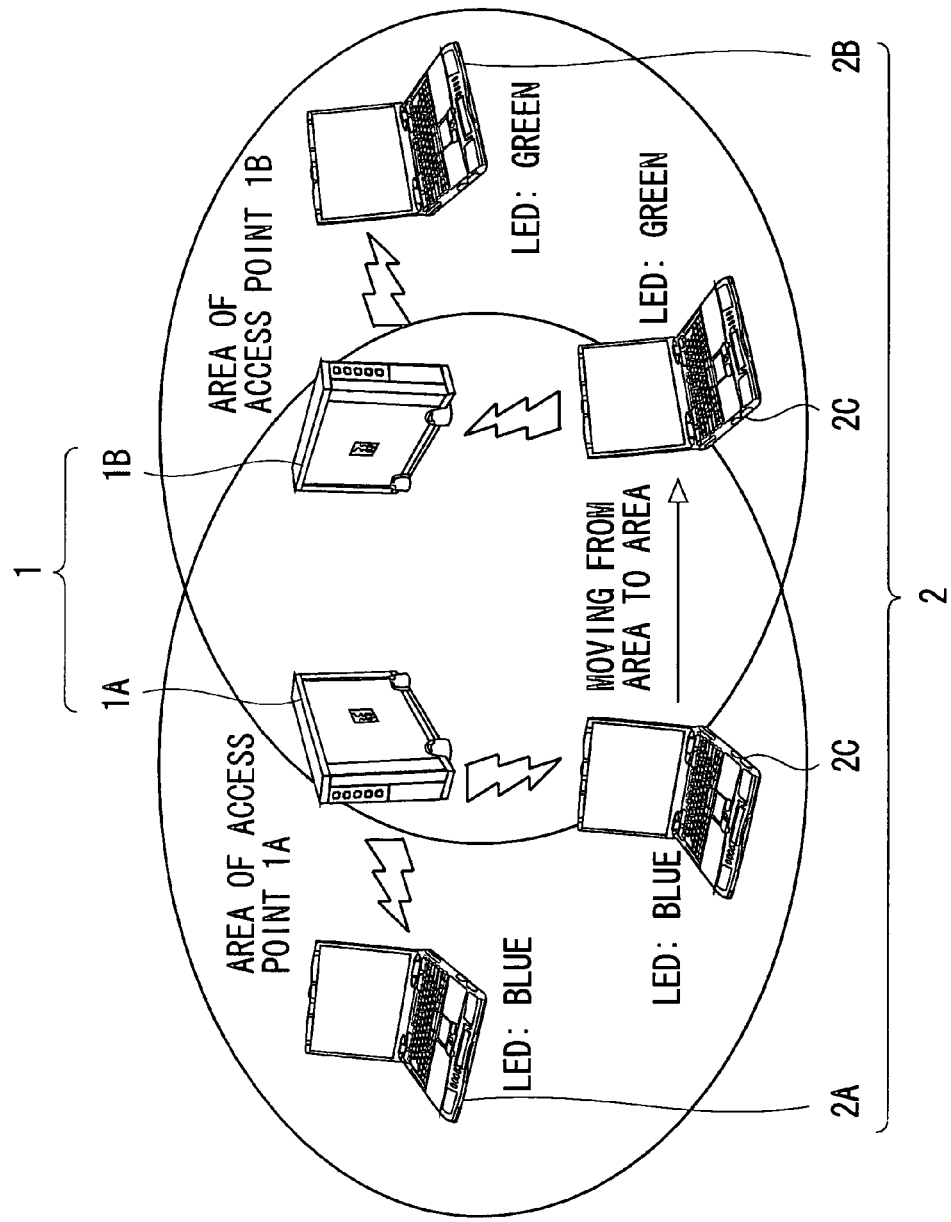
FIG. 12 is a view showing an example of utilizing the system in the first embodiment.

FIG. 12 is a view showing an example of how the present system is utilized. FIG. 12 illustrates that the plurality of access points 1 is provided, wherein one access point is set as an access point 1A, and the other access point is set as an access point 1B. Further, the plural terminals 2 are set as terminals 2A-2C.

Ever-blue lighting is set as the color information about the access point 1A, while ever-green lighting is set as the color information about the access point 1B.

Accordingly, the terminal 2A existing in an area covered by the access point 1A and connected to the access point 1A has the LED 24B lit up in blue at all times. On the other hand, the terminal 2B existing in an area covered by the access point 1B and connected to the access point 1B has the LED 24B lit up in green at all times.

Then, when the terminal 2C connected to the access point 1A and having the LED 24B lit up in blue at all times moves to (visits) the area of the access point 1B and switches over the connection to the access point 1B, the terminal 2C has the LED 24B lit up in green at all times.

It should be noted that the first embodiment has exemplified the instance in which the notifying module 15C of the access point 1 attaches the color information to the Beacon frame and thus notifies of this color-information-attached frame, however, without being limited to this instance, a scheme may be such that the notifying module 15C attaches the color information (the specified information) to each of frames of the probe response, the authentication response, the connection response (Association Response), etc and thus transmits the color-information-attached frame, while the terminal 2 extracts the color information from this frame.

At this time, the color information may also be attached to the plurality of frames. For example, the access point 1 transmits different pieces of color information through the Beacon frame, the authentication response and the connection response (Association Response), and the terminal 2 performs displaying based on the color information each time the terminal 2 receives the color information, thereby making it possible to specify a connection status in detail as to whether the terminal is in the process of receiving the Beacon frame or being authenticated or being connected.

Moreover, in the first embodiment, the authentication process and the connection process are executed irrespective of whether the color information exists or not, however, such a scheme may also be taken that the terminal not corresponding to the color information is neither authenticated (i.e., the authentication response is not sent back) nor permitted in its connection (i.e., the connection response (Association Response) is not sent back).

Furthermore, the color information transmitted by each access point 1 may be set different on a channel-by-channel basis and a network-by-network basis.

For example, if a plurality of channels can be utilized in one single access point 1, the color information may be set different on the channel-by-channel basis such that 1ch is red, 5ch is blue, and 11ch is yellow.

Further, if one single access point 1 has a plurality of BSSIDs and establishes the connections to a plurality of networks (VLANs), the color information may be set different on the VLAN-by-VLAN basis such that VLAN#1 is pink, and VLAN#2 is purple.

With this scheme, it is possible to specify which access point 1 and which channel of this access point 1 each terminal 2 is connected to or which network this terminal 2 is connected to.

As described above, according to the first embodiment, the access point 1 and the terminal 2 conduct the same display based on the color information, thereby making it feasible to specify a connection status (association status) from the external configurations of the access point 1 and of the terminal 2.

Accordingly, the management of the access point 1 is facilitated. For instance, on the occasion of installing the access point 1, it is easy to grasp which position the connectable area covers up to. Further, in the case of installing the plurality of access points 1, it is feasible to judge whether or not the terminal 2 is connected to each access point 1 in well balance.

Moreover, it is easy to specify the connection with the terminal that validly establishes the connection as described above, and hence it is easy to distinguish an invalidly-connected terminal 2 therefrom. For example, when the administrator, as explained above, opens the setting Web page from on the computer (the terminal 2 may also be available) and requests a connection list, the access point 1 sends the connection list to the terminal 2 in response to this request. The connection list is displayed on the computer or outputted by printing, and the invalidly-connected terminal can be easily distinguished by comparing this connection list with (a content of) the display on the terminal 2 within the area.

Second Embodiment

Figures 13, 14:
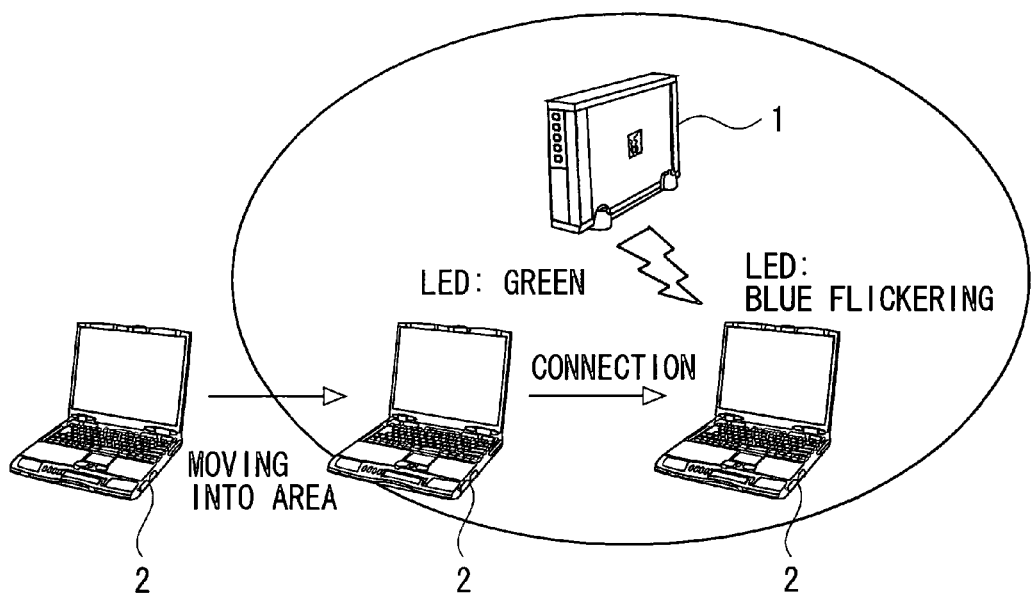
FIG. 13 is a view showing an example of utilizing the system in a second embodiment.
FIG. 14 is a schematic diagram of a data frame.

FIG. 13 is an explanatory diagram of a second embodiment according to the present invention. The second embodiment is different from the first embodiment discussed above in terms of a point that the notifying module 15C sends the specified information to the terminal 2 when the terminal 2 connects to the access point 1, but other configurations are the same. Therefore, the repetitive explanations are omitted in a way that marks the same components with the same numerals and symbols.

As shown in FIG. 9, when establishing the connection between the access point 1 and the terminal 2, the access point 1 and the terminal 2 transmit and receive the data frames to and from each other. In the second embodiment, when the terminal 2 is connected, at first, the notifying module 15C of the access point 1 generates the data frame containing the specified information (the color information) and transmits the data frame to the terminal 2 via the relay unit 16. FIG. 14 is an explanatory diagram of the data frame. Pieces of data such as "ID" identifying the specified information, "Length" showing a bit length and "Value" representing (a content of) the specified information are inserted in the data frame.

The specified information acquiring module 25B of the terminal 2 judges whether or not the "ID" in the received data frame specifies the color information, then, if this is the color information ID, extracts the color information (Value) from the data frame, and sends back the display response to the access point 1. Then, the display control module 25E causes the LED 24B to emit the light in the color corresponding to the color information and in the light emitting pattern as shown in FIGS. 4 and 5. The terminal 2 of which the connection is established can be thereby specified.

Note that the color information may be transmitted through only the data frame and may also be transmitted through the Beacon frame and the data frame, respectively.

FIG. 13 illustrates a case in which the color information of the Beacon frame is the ever-green lighting, and the color information of the data frame is the blue flicker.

The example in FIG. 13 is that the terminal 2, when located off the area of the access point 1, does not acquire the color information, and hence the LED 24B is switched OFF. When the terminal 2 moves and enters the area of the access point 1 wherein the terminal 2 receives the Beacon frame, the LED 24B is lit up in green at all times on the basis of the color information acquired from the Beacon frame. Then, when the terminal 2 connects to the access point 1 and receives the data frame as the color information, the LED 24B is flickered in blue on the basis of the color information.

Note that the color information may be made different on the terminal-by-terminal basis. For instance, the colors getting different for every access point are set, and the light emitting patterns becoming different on the terminal-by-terminal basis are designated.

Figure 15:
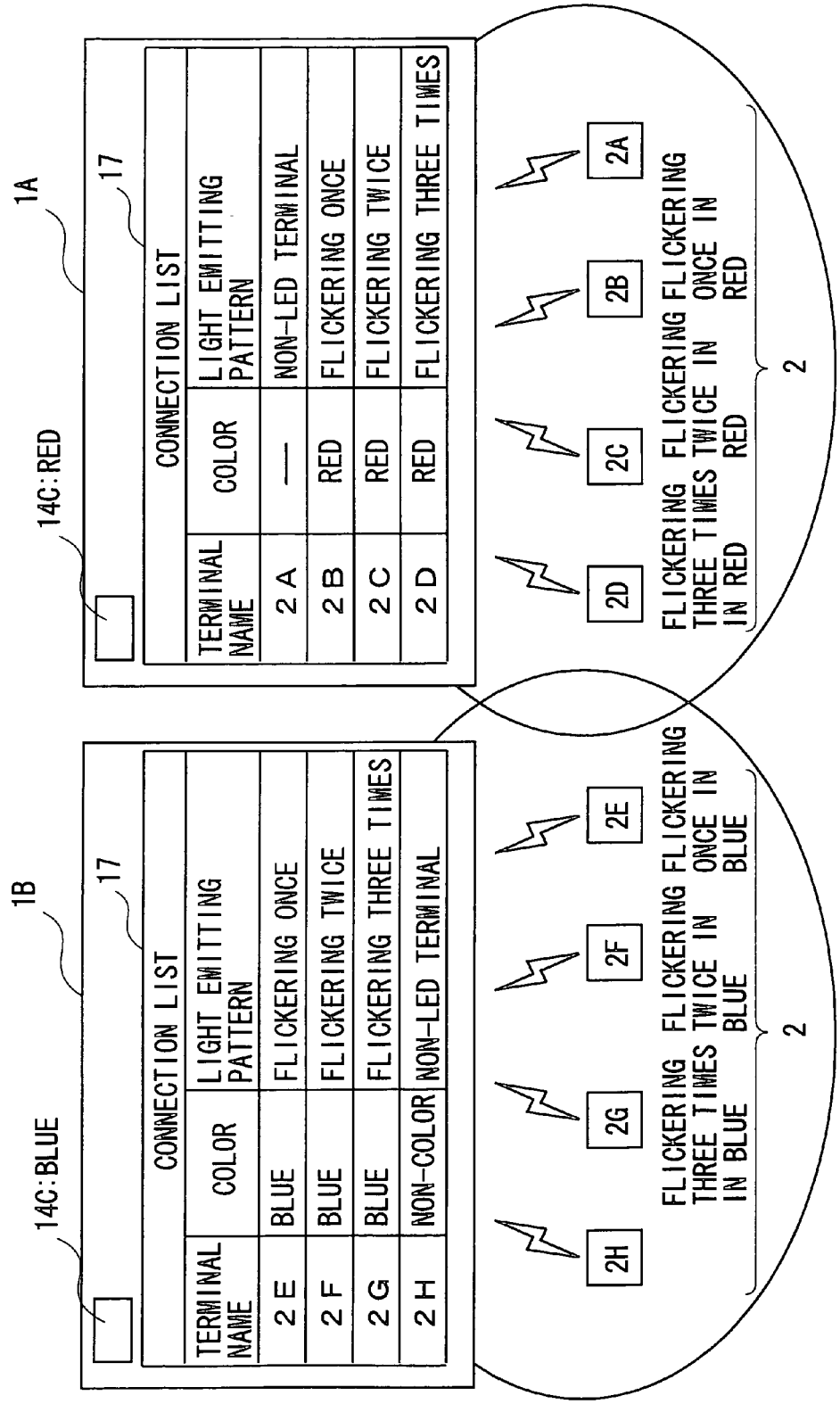
FIG. 15 is a diagram showing a color information setting example in the second embodiment.

FIG. 15 shows that the access point 1A designates the red color as the color information, and designates a flickering count different for every terminal as the light emitting pattern. To be specific, the notifying module 15C assigns the terminals 2 such a light emitting pattern that the flickering count gets smaller in the connecting sequence from the earliest, and notifies of this light emitting pattern together with the color value (red).

Similarly, the access point 1B assigns the terminals 2 the light emitting pattern in which the flickering count gets smaller in the connecting sequence from the earliest, and notifies of this light emitting pattern together with the color value (blue). At this time, the terminal information registering module 15E of each of the access points 1A, 1B registers, in a connection list 17, the identifying information and the color information (the color value and the light emitting pattern) of the terminal having the display response in a way that associates these items of information with each other.

The identifying information, though indicated by the symbol (the terminal name) of each terminal in FIG. 15, may be information that is sufficient if capable of identifying the terminal such as a MAC (Media Access Control) address and an IP (Internet Protocol) address. The terminal having none of the display response is therefore the non-LED terminal, wherein information showing a purport of being the non-LED terminal and the identifying information of this terminal are registered in the connection information in a way that associates these items of information with each other.

Then, the LED terminals 2B-2G each receiving the data frame as the color information set red or blue as the color of the LED 25B on the basis of the color information, and flicker the LED 25B a designated number of times. For example, a relatively short flicker (0.5 sec) is conducted the designated number of times after relatively long lighting (2 sec).

With this contrivance, it is feasible to distinguish between the terminals 2B-2G by counting how many times the LED is flickered till the next lighting occurs after the relatively long lighting. Accordingly, the connection status of each of the terminals 2B-2G can be individually specified by observing the areas of the access points 1A, 1B and making the comparison with the connection list.

It should be noted that the second embodiment has exemplified the instance in which the notifying module 15C of the access point 1 notifies the terminal of the data frame to which the color information is attached, however, without being limited to this scheme, such a scheme may also be available that the notifying module 15C attaches the color information (the specified information) for every terminal to the frames of the probe response, the authentication response, the connection response (Association Response), etc that are individually transmitted to the respective terminals and thus transmits each frame, while the terminal 2 extracts the color information from the frame.

At this time, the color information may also be attached to the plurality of frames. For example, the access point 1 transmits the color information that differs according to the Beacon frame, the authentication response and the connection response (Association Response), and the terminal 2 performs displaying based on the color information each time the terminal 2 receives the color information, thereby making it possible to specify the connection status in detail as to whether the terminal is in the process of receiving the Beacon frame or being authenticated or being connected.

<Others>

The present invention is not limited to the illustrative examples given above, and, as a matter of course, a variety of changes can be applied within the scope that does not deviate from the gist of the present invention.

INCORPORATION BY REFERENCE

The disclosures of Japanese patent application No. JP2006-185838 filed on Jul. 5, 2006 including the specification, drawings and abstract are incorporated herein by reference.

What is claimed is:

1. A wireless connection device, comprising:
a storage unit to store color information for designating a display mode for specifying a connection related to the wireless connection device itself;
a wireless communication unit to perform wireless communications with wireless communication devices;
a notifying module to read the color information from the storage unit and to notify each of the wireless communication device of the color information via the wireless communication unit;
a setting module to set, when the wireless communication unit receives information containing an acknowledgment of the color information from a wireless communication device notified of the color information, information indicating that the wireless connection terminal is a color-information-adaptable terminal defined as a terminal capable of displaying based on the color information into a connection list, and to set, when the wireless communication unit receives information not containing the acknowledgment of the color information from a wireless communication device notified of the color information, information indicating that the wireless connection terminal is not the color-information-adaptable terminal defined into the connection list; and
a connection list output module to output the connection list in response to a connection list request.

2. The wireless connection device according to claim 1, further comprising a relay unit that relays the communications between the wireless communication device and another device via the wireless communication unit.

3. The wireless connection device according to claim 1, wherein the color information is information that designates at least a display color or a light emitting pattern.

4. The wireless connection device according to claim 1, wherein the wireless communication unit inserts the color information given from the notifying module into a Beacon frame or a data frame, and thus transmits the color-information-attached frame to the wireless communication device.

5. The wireless connection device according to claim 1, wherein the color information designates a display mode corresponding to a channel or a network that are utilized for the wireless communications.

6. The wireless connection device according to claim 1, wherein the wireless communication unit, when establishing a connection to the wireless communication device, transmits the color information to the wireless communication device.

7. A wireless connection method executed by a wireless connection device, comprising:
  reading, from a storage unit, color information for designating a display mode for specifying a connection related to the wireless connection device itself;
  performing wireless communications with wireless communication devices;
  notifying each of the wireless communication devices of the color information read from the storage unit;
  setting, when receiving information containing an acknowledgment of the color information from a wireless communication device notified of the color information, information indicating that the wireless connection terminal is a color-information-adaptable terminal defined as a terminal capable of displaying based on the color information into a connection list, and setting, when receiving information not containing the acknowledgment of the color information from a wireless communication device notified of the color information, information indicating that the wireless connection terminal is not the color-information-adaptable terminal into the connection list; and
  outputting the connection list in response to a connection list request.

8. The wireless connection method according to claim 7, wherein the communications between the wireless communication device and another device are relayed through the wireless communications.

9. The wireless connection method according to claim 7, wherein the color information is information that designates at least a display color or a light emitting pattern.

10. The wireless connection method according to claim 7, wherein the color information is inserted into a Beacon frame or a data frame, and the color-information-attached frame is transmitted to the wireless communication device.

11. The wireless connection method according to claim 7, wherein the color information designates a display mode corresponding to a channel or a network that are utilized for the wireless communications.

12. The wireless connection method according to claim 7, wherein when establishing a connection to the wireless communication device, the color information is transmitted to the wireless communication device.

13. A non-transitory recording medium recorded with a wireless connection program for making a wireless connection device execute:
  reading, from a storage unit, color information for designating a display mode for specifying a connection related to the wireless connection device itself;
  performing wireless communications with wireless communication devices;
  notifying each of the wireless communication devices of the color information read from the storage unit
  setting, when receiving information containing an acknowledgment of the color information from a wireless communication device notified of the color information, information indicating that the wireless connection terminal is a color-information-adaptable terminal defined as a terminal capable of displaying based on the color information into a connection list, and setting, when receiving information not containing the acknowledgment of the color information from a wireless communication device notified of the color information, information indicating that the wireless connection terminal is not the color-information-adaptable terminal into the connection list; and
  outputting the connection list in response to a connection list request.

14. A wireless communication device, comprising:
  a wireless communication unit to perform wireless communications with a wireless connection device;
  a color information acquiring module to receive from the wireless connection device color information that designates a display mode for specifying a connection related to the wireless connection device via the wireless communication unit;
  a display control module to conduct a display in the display mode designated by the received color information;
  a information transmitting module to transmit information indicating that the wireless connection terminal is a color-information-adaptable terminal defined as a terminal capable of displaying based on the color information to the wireless connection device; and
  a connection list output module to transmit to the wireless connection device a connection request for a connection list that is a list for managing, respect to each of wireless communication devices, whether or not the wireless communication device is the color-information-adaptable terminal, and to receive and output the connection list transmitted by the wireless connection device receiving the connection request.

15. The wireless communication device according to claim 14, wherein the color information is information that designates at least a display color or a light emitting pattern.

16. The wireless communication device according to claim 14, wherein the color information acquiring module extracts the specified information from a Beacon frame or a data frame received by the wireless communication unit.

17. The wireless communication device according to claim 14, wherein the wireless communication unit, when making a request for a connection to the wireless connection device, sends back a signal purporting that the color information has been acquired.

18. A wireless communication method executed by a wireless communication device, comprising:
  performing wireless communications with a wireless connection device;
  receiving, from the wireless connection device, color information that designates a display mode for specifying a connection related to the wireless connection device;

conducting a display in the display mode designated by the received color information;

transmitting information indicating that the wireless connection terminal is a color-information-adaptable terminal defined as a terminal capable of displaying based on the color information to the wireless connection device;

transmitting to the wireless connection device a connection request for a connection list that is a list for managing, respect to each of wireless communication devices, whether or not the wireless communication device is the color-information-adaptable terminal; and receiving and outputting the connection list transmitted by the wireless connection device that receives the connection request.

19. A non-transitory recording medium recorded with a wireless communication program for making a wireless communication device execute:

performing wireless communications with a wireless connection device;

receiving, from the wireless connection device, color information that designates a display mode for specifying a connection related to the wireless connection device;

conducting a display in the display mode designated by the received color information;

transmitting information indicating that the wireless connection terminal is a color-information-adaptable terminal defined as a terminal capable of displaying based on the color information to the wireless connection device;

transmitting to the wireless connection device a connection request for a connection list that is a list for managing, respect to each of wireless communication devices, whether or not the wireless communication device is the color-information-adaptable terminal; and receiving and outputting the connection list transmitted by the wireless connection device that receives the connection request.

20. A network system, comprising:

a plurality of wireless connection devices; and a plurality of wireless communication devices, each of the plurality of wireless connection devices including, a storage unit to store color information for designating a display mode for specifying a connection related to the wireless connection device itself, a first wireless communication module to perform wireless communications with one or more wireless communication devices among the plurality of wireless connection devices, a sending module to send the color information stored in the storage unit to a wireless communication device, the wireless communications with which are performed by the first wireless communication module, a setting module to set, when the wireless communication unit receives information containing an acknowledgment of the color information from a wireless communication device to which the specified information is sent by the sending module, information indicating that the wireless connection terminal is a color-information-adaptable terminal defined as a terminal capable of displaying based on the color information into a connection list, and to set, when the wireless communication unit receives information not containing the acknowledgment of the color information from a wireless communication device to which the specified information is sent by the sending module, information indicating that the wireless connection terminal is not the color-information-adaptable terminal into the connection list; and a connection list output module to output the connection list in response to a connection list request, each of the plurality of wireless communication devices including, a second wireless communication module to perform wireless communications with a wireless connection device among the plurality of wireless connection devices, a color information receiving module to receive the color information from the wireless connection device, the wireless communications with which are performed by the second wireless communication module, and a display control module conducting a display in the display mode designated by the received color information, a information transmitting module to transmit information indicating that the wireless connection terminal is the color-information-adaptable terminal to the wireless connection device the wireless communications with which are performed by the second wireless communication module, and a connection list output module to transmit a connection request for the connection list to the wireless connection device the wireless communications with which are performed by the second wireless communication module, and to receive and output the connection list transmitted by the wireless connection device that receives the connection request.

* * * * *